Sept. 1, 1931.   J. ROBINSON   1,821,032
WAVE SIGNALING SYSTEM
Filed Nov. 21, 1929   2 Sheets-Sheet 1
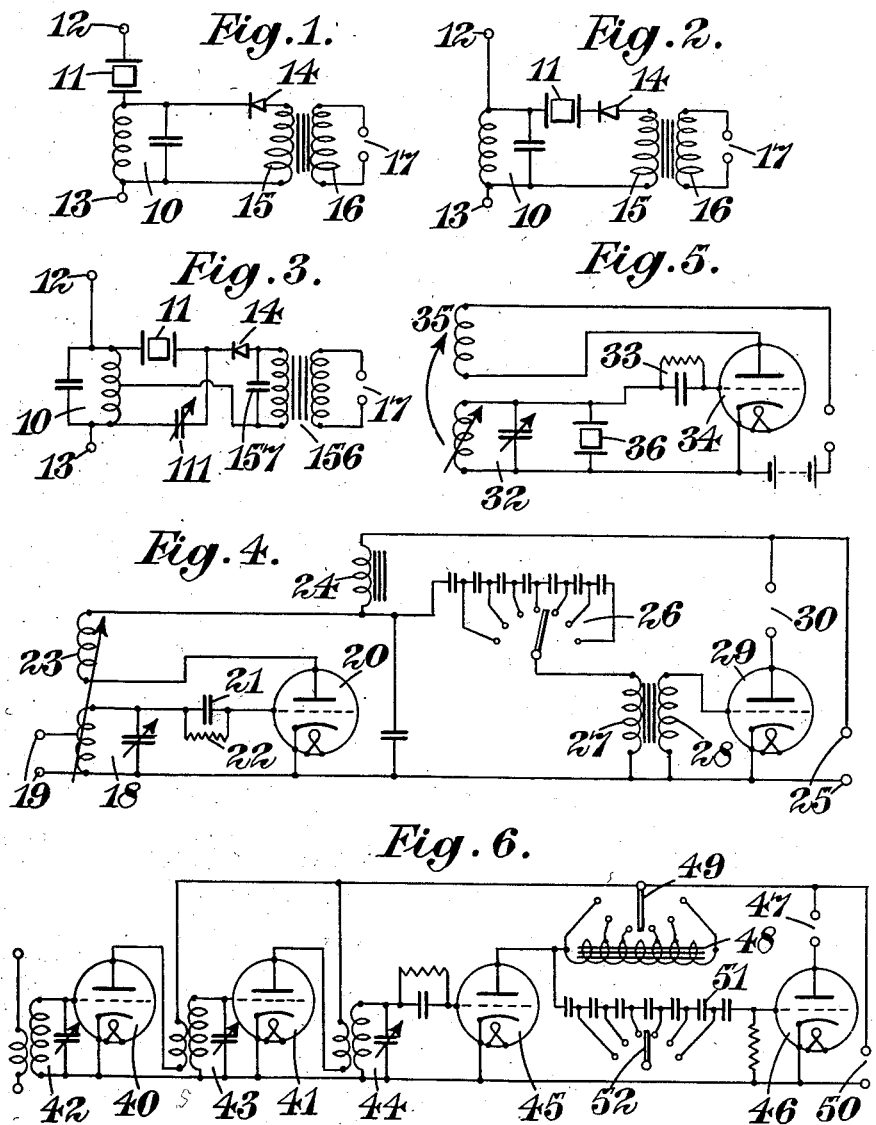

Sept. 1, 1931.    J. ROBINSON    1,821,032
WAVE SIGNALING SYSTEM
Filed Nov. 21, 1929    2 Sheets-Sheet 2
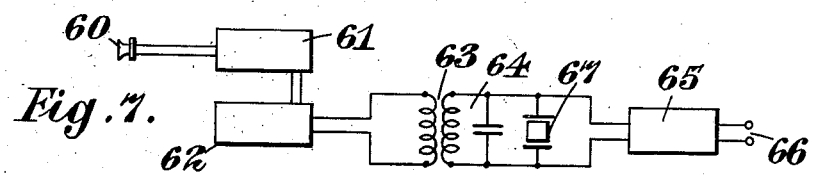
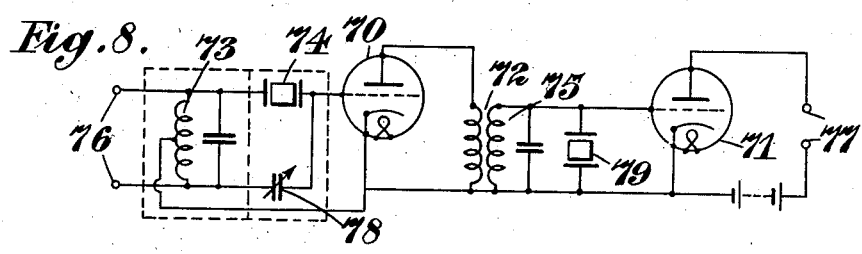
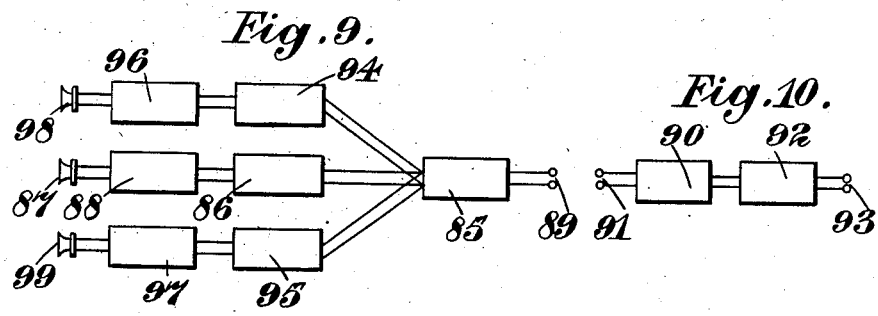
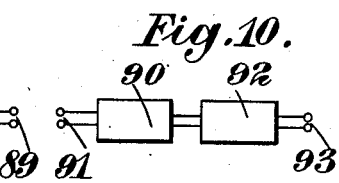

Patented Sept. 1, 1931

1,821,032

UNITED STATES PATENT OFFICE

JAMES ROBINSON, OF LONDON, ENGLAND

WAVE-SIGNALING SYSTEM

Application filed November 21, 1929, Serial No. 408,889, and in Great Britain September 9, 1929.

This invention is for improvements in or relating to wave-signaling systems. The invention is concerned with the transmission and reception of modulated or interrupted wave-energy such as wireless telephony and telegraphy.

One object of the invention is to provide a receiver which is much more selective than has been contemplated heretofore with due regard for faithful reproduction of the signals such as telephony, music, and television.

The selectivity of a receiver is usually shown in the form of a curve of which the abscissæ denote the frequency-difference, both positive and negative, from the resonant frequency of the receiver, and the ordinates denote the magnitude of the response obtained when the frequency of unmodulated applied energy is changed to the values given by the abscissæ. The amplitude diminishes with increase of frequency-difference until the response is not an effective or useful one and the band between these positive and negative effective limits may be termed the effective width of the resonance or selectivity curve of the receiver.

Since the diminution of response is gradual, and with any known receiver there is not a sharply defined cut-off, and since the audibility of a telephony interference depends on various factors including the relative strengths of the wanted and interfering signals, and the hearing ability of a normal human ear, the words "no effective response" and "no response" are used in this specification to indicate that the interference from a normally modulated transmission (e. g. a broadcasting station) is negligibly small to a normal individual when the wanted and the interfering signals are of comparable field strength.

It has heretofore been considered that when a carrier-wave is modulated by another wave, the receiver should be uniformly responsive to the carrier-wave and to frequencies equal, respectively, to the sum and difference of the carrier-frequency and modulation-frequency, these latter being known as side-band-frequencies. The range of modulation-frequencies, therefore, determines the extent of the side-band frequencies associated with a transmission. In the case of telephony, experience has shown that a range extending at least 5,000 cycles from the carrier is required for tolerably good or satisfactory reproduction, and in the case of telegraphy the side-band-frequencies must include the dot-frequency and such harmonics thereof as are necessary to give the desired signal-shape. In this specification, therefore, the words "highest modulation frequency" are used to mean the highest modulation frequency that is considered necessary for the tolerably good or satisfactory reproduction of the signals, as distinct from such higher frequencies as may be present, but whose absence from the received signal is not noticeable.

For the above reason, transmitting stations which are liable to interfere with one another have hitherto been arranged to operate on carrier-frequencies spaced apart at least sufficiently to accommodate separately the range of side-bands of each transmission (for example, a spacing of 10,000 cycles for broadcast telephony provides for two modulation ranges each of 5,000 cycles), and the receivers have been designed to give a substantially uniform response over all the side-bands of that type of transmission.

Receiving apparatus as hitherto made has been such that if two transmissions had their carriers spaced apart less than the sum of their two ranges of side-band-frequencies, interference was inevitably obtained, and I considered that this interference was primarily due to the lack of selectivity of the receiver and not necessarily to the effects of modulation (or side-bands) of the carrier-wave. I have now found that the selectivity of receivers may be increased up to the utmost possible degree so as to exclude interfering signals while still receiving all the desired modulations of wanted signals, and it is thereby possible to arrange the transmitting stations at a closer spacing of their carrier waves than has hitherto been considered possible so that it is now possible to provide a large number of additional transmission channels.

It has been proposed to use piezo-electric crystals in receivers to obtain a high degree of selectivity, but, owing to the persistance of the signals arising from the low damping of such receivers, although these receivers might operate in special cases such as very low speed telegraphy, they are useless for telephony, high speed telegraphy, or television.

Further, in some cases in attempts to improve selectivity to a small degree, the effect obtained was that the response for receiver energy equivalent to the higher modulation frequencies was low compared with the response at the resonant frequency, and therefore a greater amplification of the high tones than of the low tones was provided in order to balance up the audio frequency effects. Such receivers were, however, susceptible to interference at frequencies within the band of, say, 10,000 cycles for which they were intended to operate, and therefore it appeared that there was no advantage to be obtained by increasing the selectivity further since to remove the interference would also result in removing the energy at frequencies believed to be required for good reproduction of the signals.

The present invention accordingly comprises a wave-signaling system wherein there is employed a receiver tuned for the carrier-wave of a wanted signal and having such high selectivity and/or low damping that there is no response to interfering signals whereof the carrier-frequency lies outside the response-curve of the receiver but differs from the frequency of the wanted carrier-wave by an amount less than the highest modulation-frequency of the wanted signal, while modulations of the carrier-wave of the wanted signal corresponding to its whole modulation-range are faithfully reproduced by the aid of means for correcting the inherent signal-distortion due to the high selectivity of the receiver.

This invention also comprises a wave-signaling system wherein there is employed a receiver tuned for the carrier-wave of a wanted signal and having such high selectivity and/or low damping that there is no response to interfering modulated signals whereof the side-band-frequencies (as hereinbefore defined) differ from the frequency of the wanted carrier-wave by an amount less than the highest modulation-frequency of the wanted signal, while modulations of the carrier-wave of the wanted signal corresponding to its whole modulation-range are faithfully reproduced by the aid of means for correcting the inherent signal distortion due to the high selectivity of the receiver.

This invention still further comprises receiving apparatus having high selectivity and/or low damping suitable for use in the systems above set forth. In a specific example the receiver may be such that a response of 25% or more of the maximum response is obtained only within a frequency band of two kilocycles, that is to say, one kilocycle on each side of its resonant frequency.

One explanation which may be given for the satisfactory operation of the very selective receivers according to the present invention is as follows:

The rate of building up or dying down of the energy in the resonant portion of the receiver when receiving a modulated carrier-wave transmission (assuming that the applied signals are of uniform strength) depends on the damping of the resonant portion, and the extent to which the oscillations build up depends, therefore, on the duration of the applied signal. The signal pulses of the carrier-wave have a longer duration in the case of a low-note modulation than a high-note modulation, and consequently, owing to this time difference, the energy produced in the receiver will build up to a greater extent for the lower frequency of variation. Thus, the amplitude variation of the ultimate signal response is greater for a low note than for a high note. All the modulation effects are thus received, but do not produce a uniform response. It can be shown that for a single circuit of very low damping, such for example as a piezo crystal, the amplitude of the signal response is inversely proportional to the frequency of the signal modulation. For series circuits the extent of alternation of the relative amplitude of the modulation frequencies is dependent upon the number of such circuits employed. In the receiver according to the invention this is subsequently corrected.

The receiver may have such means as one or more piezo-electric devices or other mechanical resonators, or a plurality of tuned circuits coupled in cascade, or combinations of these to provide high selectivity.

The means for the correction of the signal may be applied at any point or points in the system, e. g. before modulating the carrier-wave at the transmitter or after the modulated signals are reduced to the modulation frequencies at the receiver. The correction may be effected in any desired manner: for example an amplifier for the selective amplification of the higher modulation frequencies may be employed or alternatively by-pass systems may be used for a proportion of the lower frequencies, or any other known devices favoring the higher modulation frequencies may be used. For convenience, such devices are hereinafter broadly referred to as means for correcting distortion or as means having an output characteristic rising with frequency, regardless of the nature of the device and regardless of whether such device is located in the receiver, the transmitter, or both.

Several embodiments of the invention will now be described with reference to the accompanying drawings showing such embodiments in a diagrammatic manner.

In the drawings—

Figure 1 shows a simple schematic arrangement for receiver with a crystal detector;

Figure 2 shows another form of crystal receiver;

Figure 3 shows yet another crystal receiver;

Figure 4 illustrates a thermionic valve receiver in which a high order of selectivity is obtained by means of reaction;

Figure 5 shows another valve receiver employing reaction to obtain selectivity;

Figure 6 shows a valve receiver employing tuned high frequency amplifying stages of high selectivity;

Figure 7 illustrates a transmission system in which means are provided for providing correction of the distortion which would occur with the use of a highly selective receiver;

Figure 8 shows a unit system comprising a highly selective circuit and a distortion-correcting circuit for use with a normal non-selective receiving apparatus design;

Figure 9 shows another transmitting system, and

Figure 10 indicates the arrangement of a receiver for use therewith.

Referring to Figure 1, the receiver comprises a parallel-tuned circuit 10 in series with a piezo-electric device 11 between input terminals 12 and 13, for example for aerial and ground connections respectively. The piezo-electric crystal offers a high impedance to incoming energy other than that of its tuned frequency, thus giving a high order of selectivity for the receiver. A crystal detector 14 is connected in series with the primary winding 15 of an output transformer across the tuned circuit 10 and the secondary winding 16 of the transformer is connected to terminals 17 for telephones. Owing to the high selectivity of the receiver, there is a disproportionate treatment of the signal frequencies in that the lower signal frequencies are more strongly received than the higher signal frequencies. This distortion is corrected in the transformer 15, 16 which is constructed to have an output characteristic which rises with the frequency, so that a correct reproduction of the signals is obtained.

Figure 2 shows a modification of the circuit shown in Figure 1, in which the piezo-electric device 11 instead of being connected in series with the tuned circuit between the aerial and ground terminals 12 and 13 is connected in series with the crystal detector 14 and primary 15 of the output transformer across the tuned circuit 10. In this arrangement also the transformer 15, 16 is constructed to have an output characteristic rising with frequency to correct for the distortion produced by the high selectivity of the receiver due to the piezo-electric device.

When employing a piezo-electric device to provide a high order of selectivity, it is desirable to employ means for eliminating effects due to the inherent capacity of the device which may be such as to provide an appreciable by-pass for the high-frequency current. In Figure 3 there is shown a modification of the receiver illustrated in Figure 2 in which the energy that is fed to the crystal detector 14 owing to the capacity of the mounting of the piezo-electric device is balanced out by energy of opposite phase fed through a variable condenser 111. The piezo-electric device 11, the crystal detector 14 and the primary of an output transformer 156 are connected in series between one end of the inductance of the tuned circuit 10 and a tapping thereon, and the variable condenser 111 is connected between the other end of the inductance and the input side of the crystal detector 14. In this example the transformer 156 as an alternative of the transformer 15, 16 of Figures 1 and 2, is designed to have normal characteristics and is tuned by means of a condenser 157 to have a resonant frequency within a few thousand cycles of the highest modulation frequency and an output characteristic rising to the tuned frequency and falling beyond the tuned frequency in order to obtain a correct reproduction of the signals at the output terminals 17. Any well-known selective or filter system which will give a preferential treatment of the higher signal frequencies with respect to the lower signal frequencies may be employed instead of the arrangements incorporated in the particular examples herein described.

Instead of employing a piezo-electric device, a thermionic valve system may be used employing reaction to provide a high order of selectivity. A valve with reaction may also be arranged as a detector or an additional detecting device may be employed. There is shown in Figure 4 a thermionic valve receiver employing a valve detector with reaction and an audio-frequency-amplifying valve. A tuned circuit 18 having input terminals 19 is connected to the cathode and control electrode of a thermionic valve 20, a condenser 21 shunted by a grid resistance 22 being connected in series with the control electrode. The anode of the valve is connected to a reaction coil 23 that is electromagnetically coupled to the inductance of the tuned circuit 18 and connected in series with a choke 24, the terminals 25 for a high tension electric supply, and the cathode of the valve 20.

From the junction of the coil 23 and choke 24 there is connected a distortion-correcting device consisting of an adjustable capacity 26, which is connected in series with the primary winding 27 of a transformer and the cathode of the valve 20. The secondary winding 28 of the transformer is connected to the cathode and control electrode of an audio-frequency-amplifying valve 29, the anode circuit of which includes output terminals 30.

By providing close coupling between the coil 23 and the inductance of the tuned circuit 18, a high degree of selectivity is obtained, but also with the introduction of distortion owing to the disproportionate treatment of the signal frequencies. This distortion is corrected by adjustment of the variable capacity device 26, the impedance of which varies with the frequency of the signal.

In Figure 5 there is shown another receiver comprising a thermionic valve system employing reaction. A tuned circuit 32 together with a grid condenser and grid resistance 33 is associated with the input side of the valve 34 and the output circuit of the valve includes a reaction coil 35 electromagnetically coupled to the inductance of the tuned circuit 32. By the use of reaction, the receiver is rendered highly selective, and the distortion which is produced is balanced by means of a piezo-electric device 36 connected in parallel with the tuned circuit 32. The piezo-electric device has the effect of offering a lower impedance to the lower signal frequencies than to the higher signal frequencies, and thus effects a correction of the distortion.

Instead of using valve systems with reaction for producing high selectivity, a succession of tuned circuits or tuned high-frequency amplifiers may be employed. In the receiver shown in Figure 6 there are employed two high frequency amplifying stages with thermionic valves 40 and 41 respectively and tuned circuits 42, 43 and 44. The tuned circuit 44 is connected to the input of the thermionic valve 45 employed as a detector, and the output of this valve is applied through a distortion-correcting device to the input of the audio-frequency-amplifying valve 46 having output terminals 47. The distortion-correcting device comprises a tapped choke 48 with a selector switch 49, through which the anode of the detector valve receives high tension current supplied to the high tension terminals 50. The anode of the detector valve is also connected to a bank of condensers 51 associated with a selector switch 52 connected to the input electrode of the valve 46.

In operation the excess of the low signal frequencies due to the high order of selectivity of the high-frequency amplifiers is corrected by adjustment of the proportions of the choke 48 and the bank of condensers 51 in circuit.

In Figure 7 there is shown diagrammatically a system for providing the correction for distortion at the transmitter. The system comprises a microphone 60 connected to a modulator 61 for the amplitude or the frequency (within the limits of the response of a piezo-electric device) of the output of a carrier-wave oscillator 62. The output of the oscillator is applied through an electromagnetic coupling 63 to a parallel-tuned circuit 64. This tuned circuit is connected to a high-frequency amplifier 65 having output terminals 66 which may for example be connected to an aerial system.

In parallel with the tuned circuit 64 there is a piezo-electric device 67 which has the effect of offering a lower impedance to the lower signal frequencies than to the higher signal frequencies. The piezo-electric device thus distorts the input to the amplifier by accentuating the higher signal frequencies. With this transmitter a receiver is used which has a high order of selectivity such that the higher signal frequencies are not received so well as the lower signal frequencies, and a uniform or undistorted output is thus obtained.

In order that existing receivers may be readily adapted for highly selective working such for example as would be necessary by the closer disposition of transmitting stations with regard to frequency, a unit device represented in Figure 8 may be employed. In this arrangement two thermionic valves 70 and 71 are coupled by an electromagnetic coupling 72. The valve 70 has a tuned input circuit 73 and a piezo-electric device 74, which is arranged in series between one side of the tuned circuit and the control electrode of the valve, in order to offer a high impedance to frequencies other than the signals to be received and thus provide a high order of selectivity.

The cathode of the valve 70 is connected to a tapping upon the inductance of the tuned circuit 73 and a variable condenser 78 is provided between the other side of the tuned circuit and the input of the valve to balance out undesired capacity effects of the mounting, as above described with reference to Figure 3. The distortion which is produced as a result of the high selectivity is corrected in a tuned circuit 75 associated with the input of the valve 71 and a piezo-electric device 79 connected in parallel with the tuned circuit. The piezo-electric device 79 arranged in this manner has the opposite effect with regard to the signal frequencies to that of the piezo-electric device 74 and provides a by-pass for a proportion of the lower modulating frequencies such that the output from the valve 71 is undistorted.

This device may be used in front of a receiver of normal characteristics, that is to say, the input terminals 76 may be connected to an aerial and earth system, and the output terminals 77 may be connected to the input terminals of the normal "flat-topped" receiver. In this manner, a very high degree of selectivity is obtained for the receiving system as a whole, in which the distortion due to the high selectivity is automatically corrected.

It is preferable that the piezo-electric devices 74 and 79 shall be identical with regard to the natural frequency; otherwise it will be necessary to rectify the output of the valve 70 and use this output to modulate oscillatory energy of the same frequency as the device 79, and then apply the modulated energy to the tuned circuit 75, or to adopt some other method of procedure.

It is highly desirable, when employing a piezo-electric device as a means for obtaining a high order of selectivity, to screen effectively the piezo-electric device and the associated electric circuits, in order to reduce to a minimum the effects due to stray energy. In Figure 8 there is indicated generally at 80 a metallic screen comprising separate compartments for the tuned circuit 73, for the piezo-electric device and balancing condenser 78, and for the valve 70 and its output circuit. In addition, screening according to known practice may be employed in this and in the other apparatus shown in the accompanying drawings.

A transmitting system employing a modulated (e. g. interrupted) carrier-wave may be employed wherein a distinguishing characteristic such as supersonic frequency is superimposed upon the carrier-wave. At the receiver there is employed, in addition to a highly selective apparatus, means by which the signal may be selected according to this characteristic.

In Figure 9 a carrier-wave oscillator 85 having an output at 89 is modulated by the output of a supersonic wave generator 86, the supersonic wave having been first modulated by the signals through a microphone 87 and modulator 88. A receiver for this transmission is indicated in Figure 10, and comprises a highly selective system with means for correction of distortion as herein described and now indicated at 90, with an input at 91 and including a rectifying device. The output of the system 90 is fed to another resonant system 92, which is tuned to the aforesaid supersonic frequency, and includes a further rectifying device in order to provide a reproduction of the signals at the output 93.

Referring again to Figure 9, additional channels for communication may be provided upon the carrier-wave produced at 85 by employing separate supersonic waves produced at 94 and 95 respectively and modulated by signals through microphones 98 and 99 and modulators 96 and 97 respectively. The several modulated supersonic frequencies are superimposed upon the carrier and transmitted thereon from the output 89. The signals to be received are selected at the receiver in the resonant system 92, which is accordingly tuned to the appropriate supersonic frequency. In this manner a large number of different signals can be transmitted upon one carrier-wave to different receiving stations and thus a still larger accommodation for radio transmissions is afforded. Similarly, a single receiving station could be provded with a plurality of differently tuned systems 92 for the simultaneous reception of a plurality of signals, as in commercial service.

When a plurality of carrier-waves are to be provided, their supersonic frequencies can be so selected with regard to the carrier-frequencies employed, that the resultant frequencies (carrier-frequency plus or minus supersonic frequency) occupy the same frequency band or bands in the ether.

The receiving apparatus described with reference to the drawings may be employed for transmissions comprising a carrier-wave with amplitude-modulation or with frequency-modulation where the receiving apparatus is selective to the range of frequencies employed.

The invention is not limited to the specific application described above, but the system of this invention employing a highly selective circuit, whether simple or complex, may be applied to high or low frequency signaling systems using wireless or line transmission, for instance, or telephone, telegraphy, picture transmission, and television.

I claim:

1. A wave signaling system including a transmitting station for transmitting a carrier wave modulated by a wanted signal, and a receiving station provided with selective receiving means, the selectivity of said means being such that there is no response to interfering signals whereof the carrier frequency of such interfering signals lies outside the resonance curve of said means, but differs from the frequency of the wanted carrier wave by an amount less than the highest modulation frequency of the wanted signal, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

2. A wave signaling system including a transmitting station for transmitting a carrier wave modulated by a wanted signal, and a receiving station provided with selective receiving means, the selectivity of said means being such that there is no response to interfering signals whereof the carrier frequency of such interfering signals lies outside the resonance curve of said means, but differs from the frequency of the wanted carrier wave by an amount less than the sum of the highest modulation frequencies of both carrier waves, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

3. A wave signaling system including a transmitting station for transmitting a carrier wave modulated by a wanted signal, and a receiving station provided with selective receiving means, the selectivity of said means being such that where there is no response to interfering signals whereof the carrier frequency of such interfering signals lies outside the resonance curve of said means, but differs from the frequency of the wanted carrier wave by an amount less than the highest modulation frequency of the wanted signal, whereby the amplitude of different modulation frequencies is altered in ratio substantially inversely proportional to the frequency ratio, yet modulations of the carrier wave of the wanted signal corresponding to the whole of the required modulation range may be reproduced, and means at one of said stations for changing the relative amplitude of the modulation frequencies substantially in proportion to such frequencies.

4. A wave signaling system including a transmitting station for transmitting a carrier wave modulated by a wanted signal, and a receiving station provided with selective receiving means, the selectivity of said means being such that there is no response to interfering signals whereof the carrier frequency of such interfering signals lies outside the resonance curve of said means, but differs from the frequency of the wanted carrier wave by an amount less than the sum of the highest modulation frequencies of both carrier waves, whereby the amplitude of different modulation frequencies is altered in ratio substantially inversely proportional to the frequency ratio, yet modulations of the carrier wave of the wanted signal corresponding to the whole of the required modulation range may be reproduced, and means at one of said stations having an output characteristic rising with frequency for changing the relative amplitude of the modulation frequencies substantially in proportion to such frequencies.

5. A wave signaling system including a transmitting station for transmitting a carrier wave modulated by a wanted signal, and a receiving station provided with selective receiving means, including a mechanical resonator of such high selectivity that there is no response to interfering signals whereof the carrier frequency of such interfering signals lies outside the resonance curve of the mechanical resonator, but differs from the frequency of the wanted carrier wave by an amount less than the highest modulation frequency of the wanted signal, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

6. A wave signaling system including a transmitting station for transmitting a carrier wave modulated by a desired signal, and a receiving station provided with selective receiving means including a piezo-electric device, the selectivity of said piezo-electric device being such that the amplitude of modulation frequencies throughout the whole of the modulation frequency range will be relatively altered, and means at one of said stations for relatively altering the amplitude of modulation frequencies in the opposite sense.

7. A wave signaling system including a transmitting station for transmitting a carrier wave modulated by a wanted signal, and a receiving station provided with selective receiving means including a piezo-electric device, the selectivity of said device being such that there is no response to interfering signals whereof the carrier frequency of such interfering signals lies outside the resonance curve of said piezo-electric device, but differs from the frequency of the wanted carrier wave by an amount less than the highest modulation frequency of the wanted signal, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

8. A wave signaling system including a transmitting station for transmitting a carrier wave modulated by a desired signal, and a receiving station provided with selective receiving means, the selectivity of said means being such that the amplitude of modulation frequencies throughout the whole of the modulation frequency range are relatively altered, and means at one of said stations for relatively altering the amplitude of the modulation frequencies in the opposite sense.

9. A wave signaling system including a transmitting station for transmitting a carrier wave modulated by a desired signal, and a receiving station provided with selective receiving means, the selectivity of said means being such that the amplitude of different modulation frequencies is altered in ratio substantially inversely proportional to the frequency ratio, and means at one of said stations for changing the relative amplitude of the modulation frequencies substantially in proportion to such frequencies.

10. A method of receiving a wave-form signal consisting of a carrier wave having modulation frequencies impressed thereon, which comprises selecting and amplifying wave-form energy within a band including the wanted carrier wave and of less width than the highest modulation frequency of the wanted signal, suppressing wave-form energy consisting of modulated carrier waves of which the carrier wave frequently falls outside of the selected band, whereby the amplitude of the higher and lower frequencies are relatively altered, and intensifying the higher modulation frequencies of the wanted signal with respect to the lower modulation frequencies thereof to the extent required for reasonably good reproduction of signals.

11. A method of receiving a wave-form music signal consisting of a modulated carrier wave, which comprises selecting and amplifying a frequency band including the frequency of the wanted signal and of appreciably less width than ten kilocycles, to the exclusion of interfering signals having frequencies falling outside of the selected band, whereby disproportionate treatment of the amplitude of the higher and lower frequencies results, and treating the signal modulation frequencies disproportionately in the opposite sense to substantially restore the proper relative amplitude of modulations of different frequency.

12. A wave signaling system adapted for music transmission including a transmitting station for transmitting a carrier wave modulated by a wanted signal, and a receiving station provided with selective receiving means, the selectivity of said means being such that a response exceeding 25% of the maximum response is obtained only for frequencies differing from resonance by no more than one kilocycle, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

13. A wave signaling system including a transmitting station for transmitting a carrier wave modulated by a desired signal, and a receiving station provided with selective receiving means including a piezo-electric device, the selectivity of said piezo-electric device being such that the amplitude of modulation frequencies throughout the whole of the modulation frequency range will be relatively altered, and means at one of said stations for relatively altering the amplitude of modulation frequencies in the opposite sense, said last named means comprising a piezo-electric device serving as a by-pass for relatively low modulation frequencies.

14. A wave signaling system including a transmitting station for transmitting a carrier wave modulated by a wanted signal, and a receiving station provided with selective receiving means, the selectivity of said means being such that there is no response to interfering signals whereof the carrier frequency of such interfering signals lies outside the resonance curve of said means, but differs from the frequency of the wanted carrier wave by an amount less than the highest modulation frequency of the wanted signal, whereby the amplitude of different modulation frequencies is altered in ratio substantially inversely proportional to the frequency ratio, yet modulations of the carrier wave of the wanted signal corresponding to the whole of the required modulation range may be reproduced, and means at one of said stations including a tuned transformer having a resonant frequency approximating the highest modulation frequency of the wanted signal for changing the relative amplitude of the modulation frequencies substantially in proportion to such frequencies.

15. In apparatus for receiving a carrier wave modulated by a desired signal, the combination with a resonant device having such high selectivity that there is no response to interfering signals whereof the carrier frequency of such interfering signals lies outside the resonance curve of said resonant device, but differs from the frequency of the wanted carrier wave by an amount less than the highest modulation frequency of the wanted signal, whereby the relative amplitude of different modulation frequencies is altered, yet modulations of the carrier wave of the wanted signal corresponding to the whole of the modulation range may be reproduced, of means for altering the relative amplitude of different modulation frequencies in the opposite sense.

16. In apparatus for receiving a carrier wave modulated by a desired signal, the combination with a resonant device having such high selectivity that there is no response to interfering signals whereof the carrier frequency of such interfering signals lies outside the resonance curve of said resonant device, but differs from the frequency of the wanted carrier wave by an amount less than the sum of the highest modulation frequencies of both carrier waves, whereby relative amplitude of different modulation frequencies is altered, yet modulations of the carrier wave of the wanted signal corresponding to the whole of the modulation range may be reproduced, of means for altering the relative amplitude of different modulation frequencies in the opposite sense.

17. In apparatus for receiving a carrier wave modulated by a desired signal, the combination with a resonant device having such high selectivity that there is no response to interfering signals whereof the carrier frequency of such interfering signals lies outside the resonance curve of said resonant device, but differs from the frequency of the wanted carrier wave by an amount less than the sum of the highest modulation frequencies of both carrier waves, whereby the amplitude of different modulation frequencies is altered in ratio substantially inversely proportional to the frequency ratio, yet modulations of the carrier wave of the wanted signal corresponding to the whole of the required modulation range may be reproduced, and means for changing the relative amplitude of the modulation frequencies substantially in proportion to such frequencies.

18. Apparatus for receiving a carrier wave modulated by a desired signal including, in combination, selective receiving means, the selectivity of said means being such that the amplitude of the modulation frequencies throughout the whole of the modulation frequency range will be relatively altered, and means for relatively altering the amplitude of the modulation frequencies in the opposite sense.

19. Apparatus for receiving a carrier wave modulated by a desired signal including, in combination, selective receiving means, the selectivity of said means being such that the amplitude of the modulation frequencies is altered in ratio substantially inversely proportional to the frequency ratio, yet modulations of the carrier wave of the wanted signal corresponding to the whole modulation range may be reproduced, and means for changing the relative amplitude of the modulation frequencies substantially in proportion to such frequencies.

20. In apparatus for receiving a carrier wave modulated by a desired signal, the combination with selective receiving means including a piezo-electric device, said device having such high selectivity that there is no response to interfering signals whereof the carrier frequency of such interfering signals lies outside the resonance curve of said piezo-electric device, but differs from the frequency of the wanted carrier wave by an amount less than the highest modulation frequency of the wanted signal, whereby the relative amplitude of different modulation frequencies is altered, yet modulations of the carrier wave of the wanted signal corresponding to the whole of the modulation range may be reproduced, of means for altering the relative amplitude of different modulation frequencies in the opposite sense.

21. In signal receiving apparatus, the combination with a resonant circuit for transmitting a modulated carrier wave, said resonant circuit including a piezo-electric device affording a high degree of selectivity, the selectivity of said device being such that the amplitude of modulation frequencies throughout the whole of the modulation frequency range may be relatively altered, and means for relatively altering the amplitude of the modulation frequencies in the opposite sense.

22. In apparatus for receiving a carrier wave modulated by a desired signal, the combination with a resonant device having such high selectivity that there is no response to interfering signals whereof the carrier frequency of such interfering signals lies outside the resonance curve of said resonant device, but differs from the frequency of the wanted carrier wave by an amount less than the sum of the highest modulation frequencies of both carrier waves, whereby the amplitude of different modulation frequencies is altered in ratio substantially inversely proportional to the frequency ratio, yet modulations of the carrier wave of the wanted signal corresponding to the whole of the required modulation range may be reproduced, and means for changing the relative amplitude of the modulation frequencies substantially in proportion to such frequencies, said last named means including a transformer having an output characteristic rising with frequency over substantially the whole of the required modulation range.

23. A wave signaling system including a transmitting station for transmitting a carrier wave modulated by a desired signal, and a receiving station providing means for transmitting said modulated carrier wave therethrough including a piezo-electric device of such high selectivity that there is no response to interfering signals whereof the carrier frequency of such intefering signals lies outside the resonance curve of said means, but differs from the frequency of the wanted carrier wave by an amount less than the sum of the highest modulation frequencies of both carrier waves, whereby the amplitude of different modulation frequencies will be relatively altered means for reproducing modulations of the carrier wave of the wanted signal corresponding to the whole of the required modulation range, and means at one of said stations for relatively altering the amplitude of the modulation frequencies in the opposite sense.

24. In apparatus of the class described, the combination with a wave signal receiver providing means for transmitting energy therethrough in response to a wanted modulated carrier wave, said means including a piezo-electric device of such high selectivity as to transmit substantially no energy in response to an interfering signal whereof the carrier frequency of such interfering signal differs from the frequency of the wanted carrier wave by an amount less than the sum of the highest modulation frequencies of both carrier waves, whereby the amount of energy corresponding to different modulation frequencies is relatively altered, and means for altering the relative intensity of energy corresponding to different modulation frequencies in the opposite sense.

25. A radio receiving apparatus for modulated wave signals comprising a resonant circuit including a piezo-electric device tuned to a constant frequency to provide a high order of selectivity resulting in disproportionate treatment of the amplitude of different modulation frequencies, a thermionic valve having a control electrode coupled to the output of the piezo-electric device, an adjustable device for applying to the said control electrode energy of opposed phase to balance any undesirable energy that is passed due to the capacity effect of the piezo-electric device, and means for intensifying different modulation frequencies in different degree to correct for the disproportionate treatment of the amplitude of such frequencies resulting from the high order of selectivity of the receiving apparatus.

26. A wave signaling system including a transmitting station for transmitting a carrier wave modulated by a wanted signal, and a receiving station provided with selective receiving means, including a piezo-electric device through which energy corresponding to said signals are passed, the selectivity of said device being such that there is no response to interfering signals whereof the carrier frequency of such interfering signals lies outside the resonance curve of the receiver, but differs from the frequency of the wanted carrier wave by an amount less than the sum of the highest modulation frequencies of both carrier waves, yet modulations of the carrier wave of the wanted signal corresponding to the whole of the required modulation range are reproduced in intensity varying with the frequency thereof, a condenser affording a path for energy opposed in phase to energy passing said piezo-electric device due to inherent capacity of the latter for balancing out such unwanted energy, and means at one of said stations for intensifying the energy corresponding to different modulation frequencies in different degree to compensate for intensity variation due to the high selectivity of the receiver.

27. A radio receiving apparatus for modulated wave signals comprising a resonant circuit including a piezo-electric device tuned to a constant frequency to provide a high order of selectivity, whereby the amplitude of wave-form energy corresponding to different modulation frequencies is altered over the whole of the desired modulation range in ratio substantially inversely proportional to the frequency ratio, a condenser affording a path for energy opposed in phase to energy passing said piezo-electric device due to inherent capacity of the latter for balancing out such unwanted energy, a detector to which the resulting energy is applied, and amplifying means including an audio frequency transformer having an output characteristic rising with frequency over the required modulation range for restoring the proper relative amplitude of the modulation frequencies.

28. A wave signaling system including a transmitting station for transmitting energy in the form of a carrier wave modulated by a desired signal, and a receiving station providing means for transmitting the energy of said modulated carrier wave therethrough, said means including a piezo-electric device, the selectivity of said means being such that the amount of energy corresponding to different modulation frequencies throughout the whole of the modulation frequency range will be relatively altered, and means at one of said stations for relatively altering the amount of energy corresponding to the different modulation frequencies in the opposite sense.

29. A wave signaling system adapted for music transmission including a transmitting station for transmitting a carrier wave modulated by a wanted signal, and a receiving station provided with selective receiving means, the selectivity of said means being such that a response exceeding 5% of the maximum response is obtained only within a frequency band of five kilocycles, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

30. Apparatus for receiving a carrier wave modulated by a desired signal including, in combination, signal receiving means of low damping, the damping of said receiving means being of such low value that the amplitude of the modulation frequencies throughout the whole of the modulation frequency range will be relatively altered, and means for relatively altering the amplitude of the modulation frequencies in the opposite sense.

31. Apparatus for receiving a carrier wave modulated by a desired signal including, in combination, signal receiving means of low damping, the damping of said receiving means being of such low value that the amplitude of the modulation frequencies is altered in ratio substantially inversely proportional to the frequency ratio, yet modulations of the carrier wave of the wanted signal corresponding to the whole modulation range may be reproduced, and means for changing the relative amplitude of the modulation frequencies substantially in proportion to such frequencies.

32. In apparatus for receiving a carrier wave modulated by a desired signal, the combination with a low damped resonant device, the damping being so low that there is no response to interfering signals whereof the carrier frequency of such interfering signals lies outside the resonant curve of said resonant device, but differs from the frequency of the wanted carrier wave by an amount less than the sum of the highest modulation frequencies of both carrier waves, whereby relative amplitude of different modulation frequencies is altered, yet modulations of the carrier wave of the wanted signal corresponding to the whole of the modulation range may be reproduced, of means for altering the relative amplitude of different modulation frequencies in the opposite sense.

33. A wave signaling system including a transmitting station for transmitting a carrier wave modulated by a wanted signal, and a receiving station provided with selective receiving means including a series of tuned circuits, the selectivity of said means being such that there is no response to interfering signals whereof the carrier frequency of such interfering signals lies outside the resonance curve of said means, but differs from the frequency of the wanted carrier wave by an amount less than the sum of the highest modulation frequencies of both carrier waves, whereby the relative amplitude of different modulation frequencies is altered, yet modulations of the carrier wave of the wanted signal corresponding to the whole of the required modulation range may be reproduced, and means at one of said stations for altering the relative amplitude of different modulation frequencies in the opposite sense.

In testimony whereof I affix my signature.

JAMES ROBINSON.

CERTIFICATE OF CORRECTION.

Patent No. 1,821,032.　　　　　　　　　　　　　　　　September 1, 1931.

JAMES ROBINSON.

It is hereby certified that error appears in the printed specification of the above numbered patent requiring correction as follows: Page 7, line 24, claim 10, for "frequently" read frequency; and that the said Letters Patent should be read with this correction therein that the same may conform to the record of the case in the Patent Office.

Signed and sealed this 19th day of June, A. D. 1934.

Bryan M. Battey (Seal)　　　　　　　　　　　　　　　　Acting Commissioner of Patents.